United States Patent
Chi et al.

(10) Patent No.: US 11,938,405 B2
(45) Date of Patent: *Mar. 26, 2024

(54) ELECTRONIC DEVICE AND METHOD FOR DETECTING ABNORMAL DEVICE OPERATION

(71) Applicant: Acer Incorporated, New Taipei (TW)

(72) Inventors: Tien-Yi Chi, New Taipei (TW);
Wei-Chieh Chen, New Taipei (TW);
Shih-Cheng Huang, New Taipei (TW);
Tzu-Lung Chuang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,365

(22) Filed: Nov. 8, 2022

(65) Prior Publication Data

US 2023/0079777 A1    Mar. 16, 2023

Related U.S. Application Data

(63) Continuation of application No. 17/202,365, filed on Mar. 16, 2021, now Pat. No. 11,541,316.

(30) Foreign Application Priority Data

Dec. 29, 2020   (TW) ................................. 109146618

(51) Int. Cl.
| | |
|---|---|
| A63F 13/75 | (2014.01) |
| A63F 13/44 | (2014.01) |
| G06F 3/0354 | (2013.01) |
| G06F 3/038 | (2013.01) |
| G06F 3/04812 | (2022.01) |
| G06N 5/04 | (2023.01) |
| G06N 20/00 | (2019.01) |

(52) U.S. Cl.
CPC .............. *A63F 13/75* (2014.09); *A63F 13/44* (2014.09); *G06F 3/03543* (2013.01); *G06F 3/038* (2013.01); *G06F 3/04812* (2013.01); *G06N 5/04* (2013.01); *G06N 20/00* (2019.01); *A63F 2300/5586* (2013.01); *A63F 2300/638* (2013.01)

(58) Field of Classification Search
CPC .. A63F 13/75; A63F 13/44; A63F 2300/5586; A63F 2300/535; G06F 3/03543; G06F 3/038; G06F 3/04812; G06N 5/04; G06N 20/00
USPC .......................................................... 463/29
See application file for complete search history.

(56) References Cited

U.S. PATENT DOCUMENTS

| | | | |
|---|---|---|---|
| 9,594,907 B2* | 3/2017 | Duke | .................... G06Q 20/308 |
| 2016/0283715 A1* | 9/2016 | Duke | ................. G06Q 20/4016 |

* cited by examiner

*Primary Examiner* — Pierre E Elisca
(74) *Attorney, Agent, or Firm* — JCIPRNET

(57) ABSTRACT

An electronic device and a method for detecting abnormal device operation are provided. The method includes: obtaining multiple action events of a movable input device, and each action event including a relative coordinate and a time stamp of the movable input device; generating multiple absolute coordinates based on the relative coordinate of each action event; estimating multiple speed vectors based on the absolute coordinates and the time stamp of each action event; estimating multiple acceleration vectors based on the speed vectors and the time stamp of each action event; and estimating a probability of abnormal operation based on the speed vectors and the acceleration vectors.

20 Claims, 1 Drawing Sheet

ELECTRONIC DEVICE AND METHOD FOR DETECTING ABNORMAL DEVICE OPERATION

CROSS-REFERENCE TO RELATED APPLICATION

This is a continuation application of and claims the priority benefit of U.S. application Ser. No. 17/202,365, filed on Mar. 16, 2021, which claims the priority benefit of Taiwan application serial no. 109146618, filed on Dec. 29, 2020. The entirety of each of the above-mentioned patent applications is hereby incorporated by reference herein and made a part of this specification.

BACKGROUND

Technical Field

The disclosure relates to a mechanism for detecting device operation, and more particularly to an electronic device and a method for detecting abnormal device operation.

Description of Related Art

In the online game industry as of today, it is common for players to team up and compete with each other. However, in competitive games, skills learnt by the players from practice are usually tested. In this case, obtaining an improper advantage with additional hardware and software assistance is often one of the important factors that destroy the healthy competitive environment in a game. Therefore, if it is possible to detect and find the players using the above manner to play the game in time, the fairness of the game may be better guaranteed.

Generally speaking, most of the players using the above manner to play the game proceed with the assistance of auxiliary operation script tools (hereinafter referred to as scripts). From the system level perspective, the scripts may be roughly divided into two levels: software level and firmware level.

In the software-level approach, the scripts run on the operating system of a gaming device (such as a computer) in the form of a program. On the other hand, in the firmware-level approach, the players or other related personnel may configure the scripts in the firmware of a hardware device (such as a mouse device) to directly output signals to the gaming device.

Existing anti-cheat software systems, such as valve anti-cheat (VAC) and BattleEye, may actively detect tool software running in parallel with the main game program, and the methods adopted thereby, for example, include scanning system threads, checking system file tampering and abnormal network packets, etc. However, since the firmware-level scripts do not use any of the above methods, detection through other ways is required.

SUMMARY

The disclosure provides an electronic device and a method for detecting abnormal device operation, which may be used to solve the above technical issues.

The disclosure provides a method for detecting abnormal device operation, which is suitable for an electronic device connected to a movable input device. The method includes the following steps. Action data of the movable input device is obtained. The action data includes multiple action events, and each action event includes a relative coordinate and a time stamp of the movable input device. Multiple absolute coordinates corresponding to the action data are generated based on the relative coordinate of each action event. Multiple speed vectors corresponding to the action data are estimated based on the absolute coordinates and the time stamp of each action event. Multiple acceleration vectors corresponding to the action data are estimated based on the speed vectors and the time stamp of each action event. A probability of the action data corresponding to abnormal operation is estimated based on the speed vectors and the acceleration vectors.

The disclosure provides an electronic device, which includes a storage circuit and a processor. The storage circuit stores a program code. The processor is coupled to the storage circuit and loads the program code to execute the following steps. Action data of a movable input device is obtained. The action data includes multiple action events, and each action event includes a relative coordinate and a time stamp of the movable input device. Multiple absolute coordinates corresponding to the action data are generated based on the relative coordinate of each action event. Multiple speed vectors corresponding to the action data are estimated based on the absolute coordinates and the time stamp of each action event. Multiple acceleration vectors corresponding to the action data are estimated based on the speed vectors and the time stamp of each action event. A probability of the action data corresponding to abnormal operation is estimated based on the speed vectors and the acceleration vectors.

DETAILED DESCRIPTION OF DISCLOSED EMBODIMENTS

Figure 1:
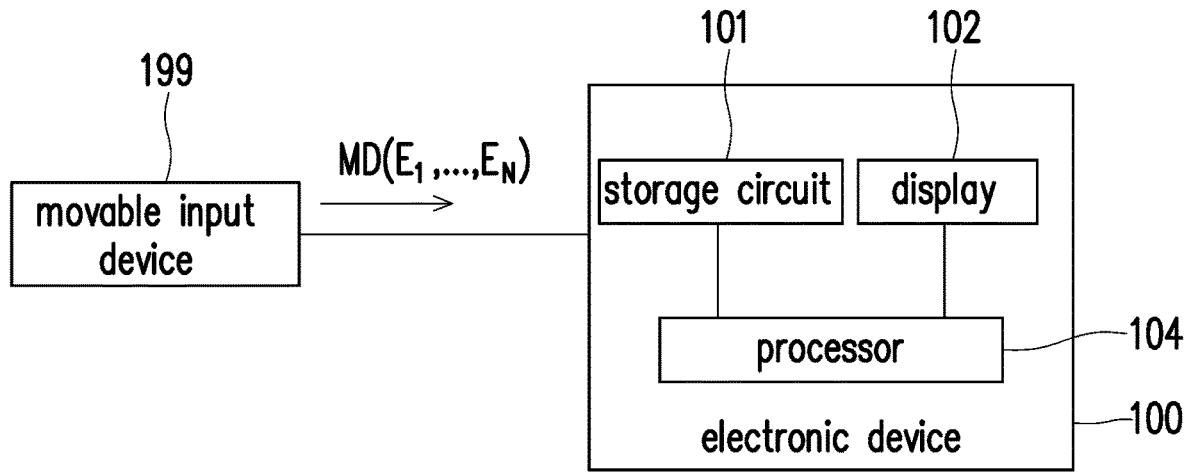
FIG. 1 is a schematic diagram of an electronic device and a movable input device according to an embodiment of the disclosure.

Please refer to FIG. 1, which is a schematic diagram of an electronic device and a movable input device according to an embodiment of the disclosure. In different embodiments, an electronic device 100 is, for example, various devices, such as a computer device and various smart devices, that may be used to run a game, but not limited thereto. As shown in FIG. 1, the electronic device 100 may be connected to a movable input device 199. The movable input device 199 is, for example, any input device, such as a mouse device or other similar handheld devices, that allows the user to control/operate the game in a mobile manner, but not limited thereto. For ease of description, the mouse device will be used as an example of the movable input device 199 below, but is not intended to limit the possible implementation of the disclosure. In other embodiments, the designer may choose any input device capable of reporting coordinates to implement the movable input device 199.

In FIG. 1, the electronic device 100 may include a storage circuit 101, a display 102, and a processor 104. The storage circuit 101 is, for example, any type of fixed or removable random access memory (RAM), read-only memory (ROM), flash memory, hard disk, other similar devices, or a combination of these devices, and may be used to record multiple program codes or modules. The display 102 is, for example, a screen that may be used to display/present the screen/content of the game.

The processor 104 is coupled to the storage circuit 101 and the display 102, and may be a general-purpose processor, a specific-purpose processor, a traditional processor, a digital signal processor, multiple microprocessors, one or more microprocessors, controllers, microcontrollers, application specific integrated circuit (ASIC), and field programmable gate array (FPGA) combined with a digital signal processor core, any other type of integrated circuit, state machine, processor based on advanced RISC machine (ARM), and the like.

In the embodiment of the disclosure, the processor 104 may access the modules and program codes recorded in the storage circuit 101 to implement the method for detecting abnormal device operation provided by the disclosure, and the details are as follows.

Figure 2:
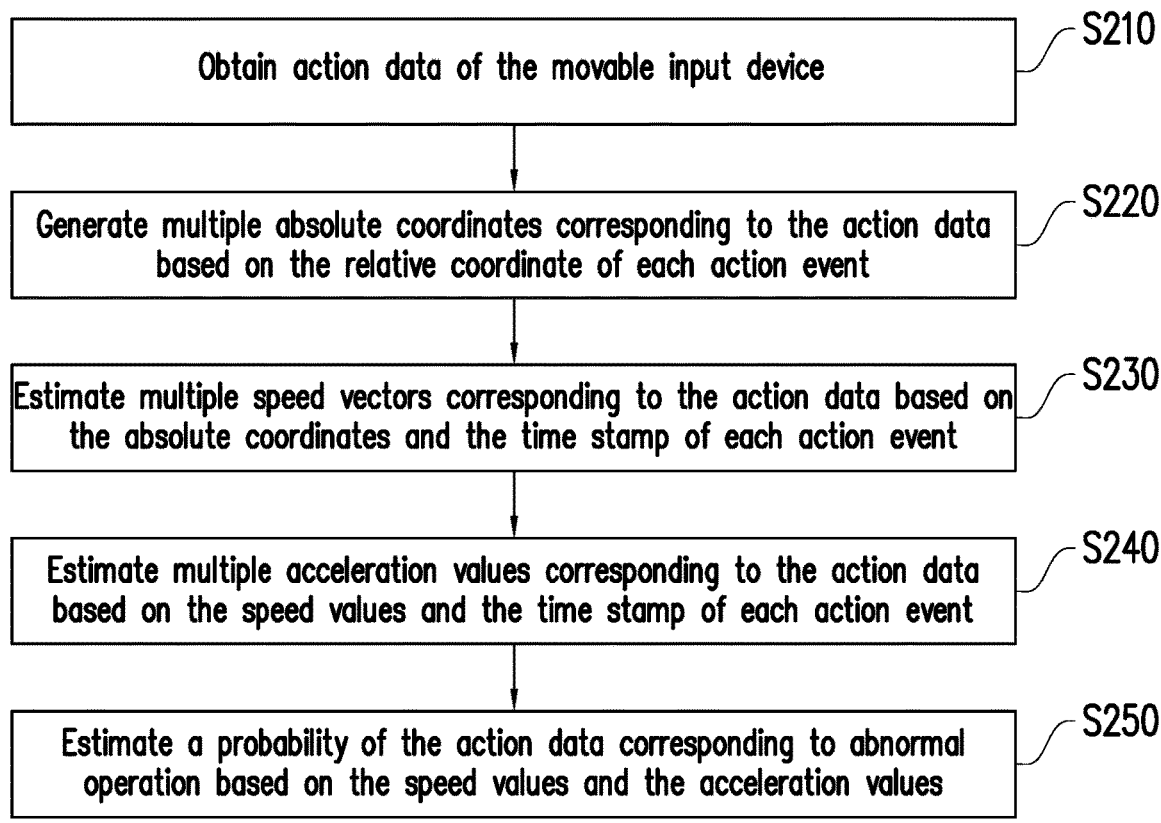
FIG. 2 is a flowchart of a method for detecting abnormal device operation according to an embodiment of the disclosure.

Please refer to FIG. 2, which is a flowchart of a method for detecting abnormal device operation according to an embodiment of the disclosure. The method of this embodiment may be executed by the electronic device 100 in FIG. 1, and the details of each step in FIG. 2 will be described below in conjunction with the elements shown in FIG. 1.

First, in Step S210, the processor 104 may obtain action data MD of the movable input device 199. The action data MD may include multiple action events $E_1$ to $E_N$ (where N is the number of action events), and each action event $E_1$ to $E_N$ may include a relative coordinate, a time stamp, and an event type of the movable input device 199.

In the embodiment of the disclosure, in the case where the movable input device 199 is assumed to be a mouse device, the action data MD is, for example, session data of the mouse device, and the action events $E_1$ to $E_N$ included thereby is, for example, multiple mouse events of the mouse device.

In the embodiment of the disclosure, the processor 104 may, for example, obtain a preset number (that is, N) of consecutive action events from an operating system of the electronic device 100 to form the action data MD of the movable input device 199, but not limited thereto. In an embodiment, when the processor 104 detects that an action event corresponding to a button pressing operation (such as pressing the left button) on the mouse device, the processor 104 obtains N consecutive action events including the action event to form the action data MD of the movable input device 199.

In other embodiments, the processor 104 may also detect that the mouse device has an action event corresponding to a button pressing operation, and form the action event and subsequent (N−1) consecutive action events as the action data MD of the movable input device 199, but not limited thereto. In this case, the action event corresponding to the button pressing operation may be understood as a first action event in the action data, but not limited thereto.

For ease of description, it is assumed that N is 7 below, and the N consecutive action events obtained by the processor 104 may have the content illustrated in Table 1 below.

TABLE 1

| Action event | Relative coordinate | Event type | Time stamp (ms) |
|---|---|---|---|
| 1 | (342, 897) | Pressing left button | 74015 |
| 2 | (339, 897) | Moving | 74016 |

TABLE 1-continued

| Action event | Relative coordinate | Event type | Time stamp (ms) |
|---|---|---|---|
| 3 | (334, 897) | Moving | 74018 |
| 4 | (333, 899) | Moving | 74019 |
| 5 | (326, 899) | Moving | 74021 |
| 6 | (324, 900) | Moving | 74022 |
| 7 | (319, 900) | Other | 74023 |

In the context of Table 1, the relative coordinate of each action event is, for example, a current cursor position of a mouse cursor of the movable input device 199 in the display 102 of the electronic device 100. For example, it is assumed that the resolution of the display 102 is 1920×1080 and the coordinate of the upper left corner of the display 102 is (0, 0). In this case, the coordinate of a cursor position corresponding to an action event 1 (that is, the first action event) in the display 102 is, for example, (342, 897); the coordinate of a cursor position corresponding to an action event 2 (that is, a second action event) in the display 102 is, for example, (339, 897); and the coordinate of a cursor position corresponding to an action event 3 (that is, a third action event) in the display 102 is, for example, (334, 897). The coordinates of cursor positions of the remaining action events in the display 102 may be deduced based on the above teaching, and will not be described here.

After that, in Step S220, the processor 104 may generate multiple absolute coordinates corresponding to the action data MD based on the relative coordinate of each action event. In an embodiment, the processor 104 may, for example, set a first absolute coordinate among the absolute coordinates to (0, 0) or other required coordinate values, but not limited thereto.

In an embodiment, during the process of obtaining an (i+1)-th absolute coordinate (where $1 \leq i \leq N-1$) among the absolute coordinates, the processor 104 may, for example, subtract the relative coordinate of the i-th action event from the relative coordinate of the (i+1)-th action event, and add the i-th absolute coordinate among the absolute coordinates to generate the (i+1)-th absolute coordinate.

For example, when i is 1, the processor 104 may, for example, subtract the relative coordinate of the first (that is, i-th) action event from the relative coordinate of the second (that is, (i+1)-th) action event, and add the first (that is, i-th) absolute coordinate among the absolute coordinates to generate a second (that is, (i+1)-th) absolute coordinate. Taking Table 1 as an example, the processor 104 may, for example, subtract the relative coordinate (that is, (342, 897)) of the action event 1 from the relative coordinate (that is, (339, 897)) of the action event 2, and add the first absolute coordinate (that is, (0, 0)) to obtain (−3, 0) as the second absolute coordinate.

For another example, when i is 2, the processor 104 may, for example, subtract the relative coordinate of the second (that is, i-th) action event from the relative coordinate of the third (that is, (i+1)-th) action event, and add the second (that is, i-th) absolute coordinate among the absolute coordinates to generate a third (that is, (i+1)-th) absolute coordinate. Taking Table 1 as an example, the processor 104 may, for example, subtract the relative coordinate (that is, (349, 897)) of the action event 2 from the relative coordinate (that is, (334, 897)) of the action event 3, and add the second absolute coordinate (that is, (−3, 0)) to obtain (−8, 0) as the third absolute coordinate.

In addition, when i is 3, the processor 104 may, for example, subtract the relative coordinate of the third (that is, i-th) action event from the relative coordinate of a fourth (that is, (i+1)-th) action event, and add the third (that is, i-th) absolute coordinates among the absolute coordinates to generate a fourth (that is, (i+1)-th) absolute coordinate. Taking Table 1 as an example, the processor 104 may, for example, subtract the relative coordinate (that is, (334, 897)) of the action event 3 from the relative coordinate (that is, (333, 899)) of an action event 4, and add the fourth absolute coordinate (that is, (−8, 0)) to obtain (−9, 2) as the third absolute coordinate.

For other values of i, the processor 104 may obtain the corresponding absolute coordinate based on the above teaching, as shown in Table 2 below.

TABLE 2

| Absolute coordinate index value | Absolute coordinate |
|---|---|
| 1 | (0, 0) |
| 2 | (−3, 0) |
| 3 | (−8, 0) |
| 4 | (−9, 2) |
| 5 | (−16, 2) |
| 6 | (−18, 3) |
| 7 | (−23, 3) |

After that, in Step S230, the processor 104 may estimate multiple speed vectors corresponding to the action data MD based on the absolute coordinates and the time stamp of each action event.

In an embodiment, the processor 104 may set a first speed vector among the speed vectors to (0, 0) or other required vectors, but not limited thereto.

In other embodiments, when $1 \leq i \leq N-1$, the processor 104 may subtract the time stamp of the i-th action event from the time stamp of the (i+1)-th action event to generate the i-th time difference value among multiple time difference values. After that, the processor 104 may subtract the i-th absolute coordinate from the (i+1)-th absolute coordinate to generate the i-th coordinate difference value among multiple coordinate difference values, and divide the i-th coordinate difference value by the i-th time difference value to generate the (i+1)-th speed vector among the speed vectors.

For example, when i is 1, the processor 104 may subtract the time stamp (that is, 74015 ms) of the first action event from the time stamp (that is, 74016 ms) of the second action event to generate a first time difference value (that is, 1 ms) among the time difference values. After that, the processor 104 may subtract the first absolute coordinate (that is, (0, 0)) from the second absolute coordinate (that is, (−3, 0)) to generate a first coordinate difference value (that is, (−3, 0)) among the coordinate difference values, and divide the first coordinate difference value by the first time difference value to generate a second speed vector (that is, (−3, 0)) among the speed vectors.

When i is 2, the processor 104 may subtract the time stamp (that is, 74016 ms) of the second action event from the time stamp (that is, 74018 ms) of the third action event to generate a second time difference value (that is, 2 ms) among the time difference values. After that, the processor 104 may subtract the second absolute coordinate (that is, (−3, 0)) from the third absolute coordinate (that is, (−8, 0)) to generate a second coordinate difference value (that is, (−5, 0)) among the coordinate difference values, and divide the second coordinate difference value by the second time difference value to generate a third speed vector (that is, (−2.5, 0)) among the speed vectors.

When i is 3, the processor 104 may subtract the time stamp (that is, 74018 ms) of the third action event from the time stamp (that is, 74019 ms) of the fourth action event to generate a third time difference value (that is, 1 ms) among the time difference values. After that, the processor 104 may subtract the third absolute coordinate (that is, (−8, 0)) from the fourth absolute coordinate (that is, (−9, 2)) to generate a third coordinate difference value (that is, (−1, 2)) among the coordinate difference values, and divide the third coordinate difference value by the third time difference value to generate a fourth speed vector (that is, (−1, 2)) among the speed vectors.

For other values of i, the processor 104 may obtain the corresponding speed vector based on the above teaching, as shown in Table 3 below.

TABLE 3

| Absolute coordinate index value | Absolute coordinate | Speed vector |
|---|---|---|
| 1 | (0, 0) | (0, 0) |
| 2 | (−3, 0) | (−3.0, 0) |
| 3 | (−8, 0) | (−2.5, 0) |
| 4 | (−9, 2) | (−1.0, 2.0) |
| 5 | (−16, 2) | (−3.5, 0) |
| 6 | (−18, 3) | (−2.0, 1) |
| 7 | (−23, 3) | (−5.0, 0) |

Thereafter, in Step S240, the processor 104 may estimate multiple acceleration values corresponding to the action data MD based on the speed values and the time stamp of each action event.

In an embodiment, the processor 104 may set a first acceleration vector among the acceleration vectors to (0, 0) or other required vectors, but not limited thereto.

In other embodiments, when $1 \leq i \leq N-1$, the processor 104 may subtract the i-th speed vector from the (i+1)-th speed vector to generate the i-th speed difference value among the speed difference values. After that, the processor 104 may divide the i-th speed difference value by the i-th time difference value to generate the (i+1)-th acceleration vector among the acceleration vectors.

For example, when i is 1, the processor 104 may subtract the first speed vector (that is, (0, 0)) from the second speed vector (that is, (−3.0, 0)) to generate a first speed difference value (that is, (−3.0, 0)) among the speed difference values. After that, the processor 104 may divide the first speed difference value by the first time difference value (that is, 1 ms) to generate a second acceleration vector (that is, (−3.0, 0)) among the acceleration vectors.

For another example, when i is 2, the processor 104 may subtract the second speed vector (that is, (−3.0, 0)) from the third speed vector (that is, (−2.5, 0)) to generate a second speed difference value (that is, (0.5, 0)) among the speed difference values. After that, the processor 104 may divide the second speed difference value by the second time difference value (that is, 2 ms) to generate a third acceleration vector (that is, (0.25, 0)) among the acceleration vectors.

When i is 3, the processor 104 may subtract the third speed vector (that is, (−2.5, 0)) from the fourth speed vector (that is, (−1.0, 2.0)) to generate a third speed difference value (that is, (1.5, 2.0)) among the speed difference values. After that, the processor 104 may divide the third speed difference value by the third time difference value (that is, 1 ms) to generate a fourth acceleration vector (that is, (1.5, 2.0)) among the acceleration vectors.

For other values of i, the processor 104 may obtain the corresponding acceleration vector based on the above teaching, as shown in Table 4 below.

TABLE 4

| Absolute coordinate index value | Absolute coordinate | Speed vector | Acceleration vector |
| --- | --- | --- | --- |
| 1 | (0, 0) | (0, 0) | (0, 0) |
| 2 | (−3, 0) | (−3.0, 0) | (−3.0, 0) |
| 3 | (−8, 0) | (−2.5, 0) | (0.25, 0) |
| 4 | (−9, 2) | (−1.0, 2.0) | (1.5, 2.0) |
| 5 | (−16, 2) | (−3.5, 0) | (−1.25, −1.0) |
| 6 | (−18, 3) | (−2.0, 1) | (1.5, 1.0) |
| 7 | (−23, 3) | (−5.0, 0) | (−3.0, −1.0) |

Then, in Step S250, the processor 104 may estimate a probability of the action data MD corresponding to abnormal operation based on the speed values and the acceleration values.

In an embodiment, the processor 104 may input the speed values and the acceleration values into a pretrained machine learning model. The machine learning model may output the probability of the action data MD corresponding to the abnormal operation in response to the speed values and the acceleration values. In different embodiments, the machine learning model may be implemented by adopting a model, such as a long short term memory (LSTM) model, a hidden Markov model (HMM), a recurrent neural network (RNN), or an attention-based neural network, but not limited thereto.

During the pretraining process of the machine learning model, the processor 104 may, for example, obtain historical action data (which may include N consecutive historical action events) corresponding to abnormal operation of the movable input device 199, which is converted into multiple corresponding historical speed vectors and historical acceleration vectors by the operations taught in Steps S220 to S240. After that, the processor 104 may input the historical speed vectors and the historical acceleration vectors as training data into the machine learning model, so that the machine learning model predicts a probability of the historical action data corresponding to the abnormal operation accordingly. After that, the processor 104 may determine the prediction accuracy of the machine learning model based on the predicted probability, thereby updating various parameters of the machine learning model accordingly.

After repeating the above process, the probability of the abnormal operation predicted by the machine learning model should gradually become more accurate.

Therefore, when the processor 104 inputs the speed values and the acceleration values in Table 4 into the machine learning model in Step S250, the probability of the action data MD corresponding to the abnormal operation predicted by the machine learning model may be used as reference for game management personnel or other related personnel. In this way, the game management personnel may effectively grasp which mobile devices used by the players may have scripts configured in the firmware, thereby maintaining the fairness of the game.

In summary, the embodiments of the disclosure may obtain the speed vectors and the acceleration vectors corresponding to the action data accordingly after collecting the action data including the action events, thereby predicting the probability of the abnormal operation on the movable input device through the neural network. In this way, the game management personnel may effectively grasp which mobile devices used by the players may have scripts configured in the firmware, thereby better maintaining the fairness of the game.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be determined by the scope of the appended claims.

What is claimed is:

1. A method for detecting abnormal device operation, suitable for an electronic device connected to a movable input device, the method comprising:
    obtaining action data of the movable input device, wherein the action data comprises a plurality of action events, and each of the action events comprises a time stamp of the movable input device;
    generating a plurality of absolute coordinates corresponding to the action data based on the action events;
    estimating a plurality of speed vectors corresponding to the action data based on the absolute coordinates and the time stamp of each of the action events;
    estimating a plurality of acceleration vectors corresponding to the action data based on the speed vectors and the time stamp of each of the action events; and
    estimating a probability of the action data corresponding to abnormal operation based on the speed vectors and the acceleration vectors.

2. The method according to claim 1, wherein the movable input device comprises a mouse device, each of the action events further comprises an event type, and the event type corresponding to an i-th action event among the action events comprises a button pressing operation of the mouse device.

3. The method according to claim 2, wherein i is 1.

4. The method according to claim 2, wherein the electronic device comprises a display, and the relative coordinate of each of the action events corresponds to a cursor position of a mouse cursor on the display.

5. The method according to claim 1, wherein the action events comprise an i-th action event and an (i+1)-th action event, $1 \leq i \leq N-1$, where N is a number of the action events, and the step of generating the absolute coordinates corresponding to the action data based on the relative coordinate of each of the action events comprises:
    subtracting the relative coordinate of the i-th action event from the relative coordinate of the (i+1)-th action event, and add an i-th absolute coordinate among the absolute coordinates to generate an (i+1)-th absolute coordinate among the absolute coordinates.

6. The method according to claim 5, wherein an absolute coordinate of a first action event among the action events is (0, 0).

7. The method according to claim 6, wherein a first speed vector among the speed vectors is (0, 0).

8. The method according to claim 1, wherein the action events comprise an i-th action event and an (i+1)-th action event, the absolute coordinates comprise an i-th absolute coordinate and an (i+1)-th absolute coordinate, $1 \leq i \leq N-1$, where N is a number of the action events, and the step of estimating the speed vectors corresponding to the action data based on the absolute coordinates and the time stamp of each of the action events comprises:

subtracting the time stamp of the i-th action event from the time stamp of the (i+1)-th action event to generate an i-th time difference value among a plurality of time difference values;

subtracting the i-th absolute coordinate from the (i+1)-th absolute coordinate to generate an i-th coordinate difference value among a plurality of coordinate difference values; and dividing the i-th coordinate difference value by the i-th time difference value to generate an (i+1)-th speed vector among the speed vectors.

9. The method according to claim 1, wherein the action events comprise an i-th action event and an (i+1)-th action event, the speed vectors comprise an i-th speed vector and an (i+1)-th speed vector, $1 \le i \le N-1$, where N is a number of the action events, and the step of estimating the acceleration vectors corresponding to the action data based on the speed vectors and the time stamp of each of the action events comprises:

subtracting the time stamp of the i-th action event from the time stamp of the (i+1)-th action event to generate an i-th time difference value among a plurality of time difference values;

subtracting the i-th speed vector from the (i+1)-th speed vector to generate an i-th speed difference value among a plurality of speed difference values; and dividing the i-th speed difference value by the i-th time difference value to generate an (i+1)-th acceleration vector among the acceleration vectors.

10. The method according to claim 9, wherein a first acceleration vector among the acceleration vectors is (0, 0).

11. The method according to claim 1, wherein the step of estimating the probability of the action data corresponding to the abnormal operation based on the speed vectors and the acceleration vectors comprises:

inputting the speed vectors and the acceleration vectors into a pretrained machine learning model, wherein the machine learning model outputs the probability of the action data corresponding to the abnormal operation in response to the speed vectors and the acceleration vectors.

12. The method according to claim 1, wherein the step of obtaining the action data of the movable input device comprises:

obtaining the action data of the movable input device from an operating system of the electronic device.

13. An electronic device, comprising:

a storage circuit, storing a program code; and a processor, coupled to the storage circuit and loading the program code to execute following steps of:

obtaining action data of a movable input device, wherein the action data comprises a plurality of action events, and each of the action events comprises a time stamp of the movable input device;

generating a plurality of absolute coordinates corresponding to the action data based on the action events;

estimating a plurality of speed vectors corresponding to the action data based on the absolute coordinates and the time stamp of each of the action events;

estimating a plurality of acceleration vectors corresponding to the action data based on the speed vectors and the time stamp of each of the action events; and estimating a probability of the action data corresponding to abnormal operation based on the speed vectors and the acceleration vectors.

14. The electronic device according to claim 13, wherein the movable input device comprises a mouse device, each of the action events further comprises an event type, and the event type corresponding to an i-th action event among the action events comprises a button pressing operation of the mouse device.

15. The electronic device according to claim 13, wherein the electronic device comprises a display, and the relative coordinate of each of the action events corresponds to a cursor position of a mouse cursor on the display.

16. The electronic device according to claim 13, wherein the action events comprise an i-th action event and an (i+1)-th action event, $1 \le i \le N-1$, where N is a number of the action events, and the processor performs:

subtracting the relative coordinate of the i-th action event from the relative coordinate of the (i+1)-th action event, and add an i-th absolute coordinate among the absolute coordinates to generate an (i+1)-th absolute coordinate among the absolute coordinates.

17. The electronic device according to claim 13, wherein the action events comprise an i-th action event and an (i+1)-th action event, the absolute coordinates comprise an i-th absolute coordinate and an (i+1)-th absolute coordinate, $1 \le i \le N-1$, where N is a number of the action events, and the processor performs:

subtracting the time stamp of the i-th action event from the time stamp of the (i+1)-th action event to generate an i-th time difference value among a plurality of time difference values;

subtracting the i-th absolute coordinate from the (i+1)-th absolute coordinate to generate an i-th coordinate difference value among a plurality of coordinate difference values; and dividing the i-th coordinate difference value by the i-th time difference value to generate an (i+1)-th speed vector among the speed vectors.

18. The electronic device according to claim 13, wherein the action events comprise an i-th action event and an (i+1)-th action event, the speed vectors comprise an i-th speed vector and an (i+1)-th speed vector, $1 \le i \le N-1$, where N is a number of the action events, and the processor performs:

subtracting the time stamp of the i-th action event from the time stamp of the (i+1)-th action event to generate an i-th time difference value among a plurality of time difference values;

subtracting the i-th speed vector from the (i+1)-th speed vector to generate an i-th speed difference value among a plurality of speed difference values; and dividing the i-th speed difference value by the i-th time difference value to generate an (i+1)-th acceleration vector among the acceleration vectors.

19. The electronic device according to claim 13, wherein the processor performs:

inputting the speed vectors and the acceleration vectors into a pretrained machine learning model, wherein the machine learning model outputs the probability of the action data corresponding to the abnormal operation in response to the speed vectors and the acceleration vectors.

20. The electronic device according to claim 13, wherein the processor performs:

obtaining the action data of the movable input device from an operating system of the electronic device.

* * * * *